United States Patent [19]

Clementoni et al.

[11] 4,283,230

[45] Aug. 11, 1981

[54] AIR-TREATED PROPANE-PRECIPITATED ASPHALT

[75] Inventors: Dominick Clementoni, Union; Luke W. Corbett, Mountainside, both of N.J.

[73] Assignee: Exxon Research & Engineering Co., Florham Park, N.J.

[21] Appl. No.: 111,030

[22] Filed: Jan. 10, 1980

[51] Int. Cl.³ ............................................. C08L 95/00
[52] U.S. Cl. .................................. 106/274; 106/278; 106/281 R; 208/44; 427/138
[58] Field of Search ................... 106/281 R, 274, 278; 208/44; 427/138

[56] References Cited

U.S. PATENT DOCUMENTS

| | | | |
|---|---|---|---|
| 3,317,447 | 5/1967 | Black et al. | 260/28.5 |
| 3,793,189 | 2/1974 | Corbett | 208/23 |
| 3,960,585 | 6/1976 | Gaw | 106/274 |
| 3,977,891 | 8/1976 | Bertrand | 106/281 R |
| 4,024,076 | 5/1977 | Miyake et al. | 106/274 |
| 4,139,397 | 2/1979 | Yan | 106/278 |

FOREIGN PATENT DOCUMENTS 1380095 10/1964 France .
610629 10/1948 United Kingdom .
956313 4/1964 United Kingdom .

OTHER PUBLICATIONS

Hydrocarbon Processing, vol. 58, pp. 173–177, Apr. 1979.
Distribution and Reactions of Sulfur in "Asphalt During Air Blowing and Sulfurizing Process" I & EC Product Research and Development, vol. 4, No. 1, pp. 51–57, Mar. 1965.

Primary Examiner—Lorenzo B. Hayes
Assistant Examiner—Amelia B. Yarbrough
Attorney, Agent, or Firm—Robert J. North

[57] ABSTRACT

Propane-precipitated asphalt is contacted with a stream of air at 200° C. and above to increase the softening point of the asphalt. The resulting asphalt base, having a softening point of about 65°–300° C., is then blended with 5–60 weight percent liquid sulfur-treated petroleum fraction, having an equivalent atmospheric boiling point range of 370°–500° C., to yield paving grade quality asphalt cement composition.

13 Claims, 1 Drawing Figure

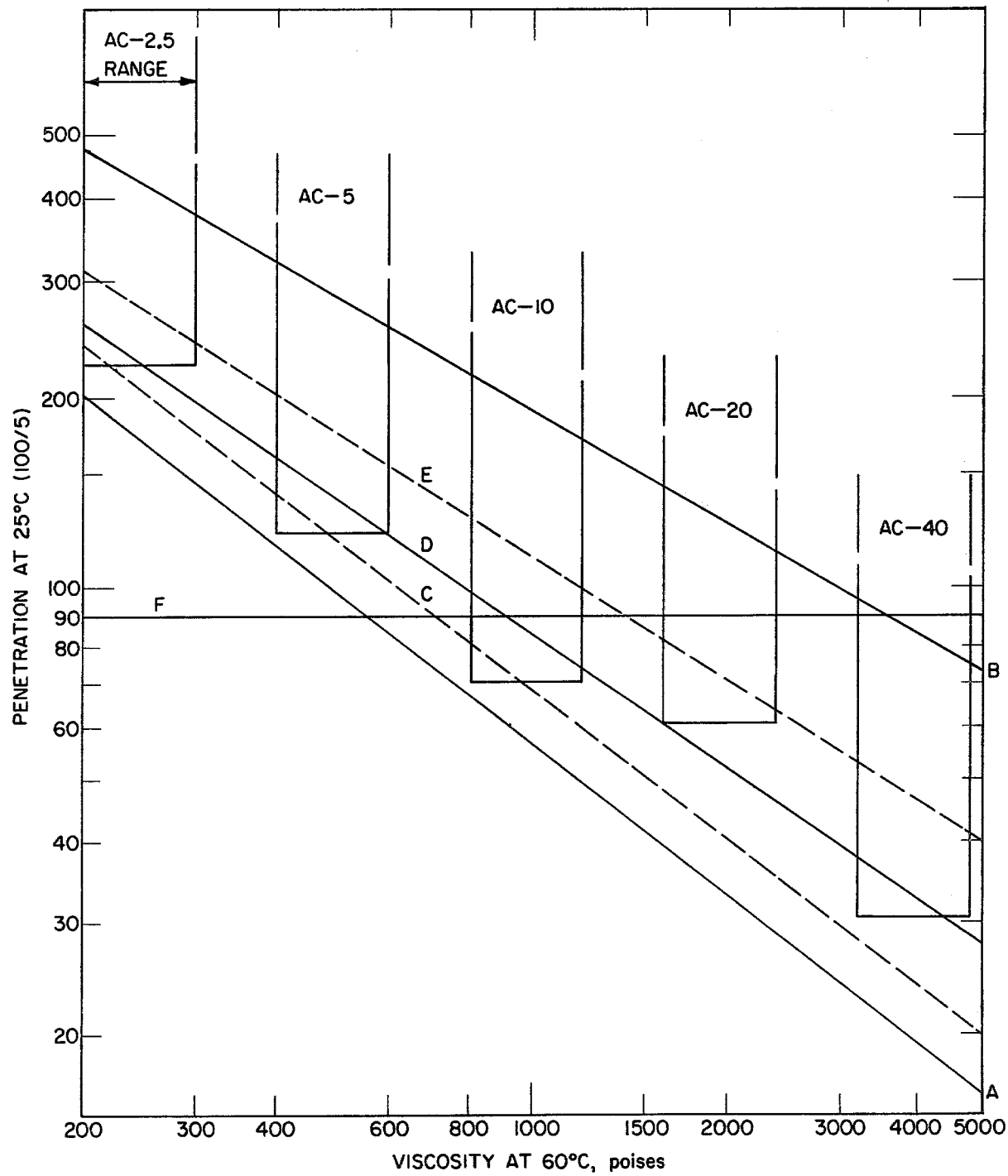

AIR-TREATED PROPANE-PRECIPITATED ASPHALT

BACKGROUND OF THE INVENTION

1. Field of the Invention

This invention relates to a paving grade asphalt cement composition, a process for its manufacture, and its use in paving operations. The composition is manufactured by blending an air-treated propane-precipitated asphalt (PPA), with a sulfur-treated liquid petroleum fraction, having an atmospheric equivalent boiling range of about 370°–500° C. The produced asphalt cement composition has improved temperature susceptibility and ductility characteristics. The air-treated PPA can be produced by treating the PPA with a stream of air at a temperature about 200° C. resulting in an increased softening point of the material.

2. Description of the Prior Art

Asphalt formulations commonly termed "asphalt," or "bitumen," which are used in road paving operations are blends of an "asphalt cement," i.e. a binder material, and inorganic mineral aggregate, such as stone, sand and/or mineral filler.

Asphalt cement composition prepared from heavy crude oil is normally a "straight run residuum," being the residue produced after distilling off volatile petroleum fractions from the asphalt-bearing crude oil. Normally, this residuum is a liquid which can be "run" out of the distillation process at elevated temperature and, after adjustment, for consistency, is suitable for directly producing asphalt formulations.

However, it is often necessary to adjust the composition of the residuum in order to meet strict paving grade asphalt specifications. This is particularly true of asphalts prepared from light crudes having relatively high API gravities, such as Arabian Light which is a large source of asphalt-bearing crude oil. Normally, API gravities (measured at 15.5° C.) for medium and heavy crudes is in the range of 20° to 30°, whereas for lighter crudes, including Arabian Light, the gravities are about 30° and higher. A residuum from these light crudes is always marginal for asphalt manufacture because it is not directly obtainable as a "straight run residuum" for producing acceptable paving grade asphalt cements, for example, ASTM paving grades AC-2½, AC-5, AC-10, AC-20 and AC-40 which meet the rigid specifications of ASTM D 3381-76 specifically Table 2, and AASHTO M 226-73, Table II. Paving grades meeting these specifications possess excellent temperature susceptibility and ductility properties as required for example in the United States and Australia.

By the term, "temperature susceptibility," as used herein, is meant the susceptibility of an asphalt cement to variations in viscosity or penetration (ASTM D-5) with temperature, wherein low levels of temperature susceptibility lead to excellent rheological and flow characteristics of the asphalt. The term "viscosity" is well-known and is the ratio between the applied shear stress and rate of shear and is thus a measure of the resistance to flow of the liquid. The term, "penetration" is well-known and is the consistency of a bituminous material expressed in tenths of a millimeter that a standard needle vertically penetrates a sample of the material under known conditions of loading, time and temperature. The term "ductility," is well-known and is a measure of the elasticity of the asphalt cement, as determined by ASTM D 113-79. High ductility leads to improved resistance to cracking and disbonding. Thus, an acceptable asphalt material should have a low level of temperature susceptibility and high ductility.

Further factor in light of the current energy shortage, is that the use of a straight run residuum is being discouraged since the residuum still contains considerable amounts of lubricating oil fractions which are often more valuable in other applications than in asphalt paving formulations. Consequently, liquid oil fractions are additionally solvent-extracted from the residuum, following distillation, to maximize lubricating oil and fuel product yields.

One process in the art that is currently used is the treatment of a residuum with propane to extract heavy gas oil fractions yielding a liquid propane-extracted oil fraction and a solid propane-precipitated asphalt, termed "PPA". The propane-extracted oil fraction can then further be extracted with furfural or phenol, for example, to yield a raffinate suitable for making lube oils. The remaining liquid material, after removal of solvent is an extract fraction called "extract oil." The extract oil can be blended, i.e. "fluxed" with the solid PPA obtained from the propane treatment, to form an asphalt cement composition with improved temperature susceptibility and ductility characteristics. These characteristics can be further improved by subjecting the PPA to "air-blowing," i.e. treating the mixture with an air stream at about 250°–300° C. for a period of time to increase the softening point and temperature susceptibility of the material. However, "air-blown" material, sometimes termed "semi-blown" material, prepared from a PPA derived from a light residuum, such as derived from Light Arabian Crude, and fluxed with straight extract oil, is still marginal with respect to meeting temperature susceptibility and ductility requirements of ASTM D 3381-76 and AASHTO M 226-73. What is desired is a process which will further improve these properties toward meeting specifications.

Currently there are paving formulations being used which incorporate elemental sulfur as a dispersion to improve its temperature susceptibility characteristics. However, a contractor who buys the base and mixes it with mineral aggregate, prior to use, must heat the material in large quantities to achieve a workable consistency thus, periodically generating sulfurous fumes. What is desired is an asphalt base or cement formulation having improved temperature susceptibility and ductility characteristics which also does not emit noxious or toxic sulfur-containing fumes upon mixing with mineral aggregate or application to road surfaces.

Sulfur-treating of bituminous material is known in the art. For example, sulfur-treating of propane-precipitated asphalt (PPA) to improve the blending properties of the asphalt in bitumens is known and is described in British Pat. No. 956,313. The patent describes heating PPA with 2–20 weight percent elemental sulfur at 130°–300° C. for 2–10 hours to increase the asphaltene content and reduce the wax content of the material. However, no specification mention is made of the combined steps of treating the PPA, derived from a residuum from a light crude by air-blowing, and then blending the resulting base material with a sulfur-treated extract oil to obtain an asphalt cement composition capable of meeting specifications.

British Pat. No. 610,629 describes the production of improved bituminous asphalt material in which a mixture of an asphalt, an unsaturated vegetable oil, e.g.

linseed oil, and sulfur is heated at about 175°-180° C. until, a smooth, homogeneous bubble-free molten mass is obtained. The resulting material is described as exhibiting good thermal stability, and good susceptibility to plastic flow. However, the process requires the presence and added expense of an unsaturated vegetable oil for obtaining good rheological properties.

U.S. Pat. No. 3,317,447 (1967) discloses a process for treating asphaltenes (a minor fraction of asphalt) derived from crude oil residua. The asphaltenes are heated with an alpha olefin polymer in the presence of elemental sulfur at about 150°-540° C. to yield a reaction product having a melting point in the range of about 130°-315° C. The reference states that asphaltic compositions produced by heating asphaltenes with sulfur alone produces inferior compositions for many applications.

What is desired is a convenient and inexpensive process for preparing asphalt cement compositions having excellent temperature susceptibility and ductility characteristics, from a propane-precipitated asphalt, which doesn't require treating the material with unsaturated vegetable oils or organic polymers. Particularly what is desired is a process for converting propane-precipitated asphalt derived from a light crude oil into a high quality asphalt cement composition of ASTM grades AC-2½, AC-5, AC-10, AC-20 and AC-40 which meet the specifications of ASTM D 3381-76 (Table 2) or AASHTO M 226-73 (Table II).

SUMMARY OF THE INVENTION

We have unexpectedly found that asphalt cement compositions, of ASTM paving grade quality, can be produced by blending an air-treated propane-precipitated asphalt base material with a sulfur-treated liquid petroleum fraction having an equivalent atmospheric boiling range of about 370°-500° C. The produced asphalt cement composition has improved temperature susceptibility and ductility characteristics.

Preferred embodiments are where the propane-precipitated asphalt is derived from a residuum from a light Arabian crude and the resulting asphalt cement composition, being grade AC-10 or AC-20, meets the specifications of ASTM D 3381-76 Table 2, or AASHTO M 226-73, Table II.

In accordance with this invention there is provided a process for preparing an asphalt cement composition comprising the step of blending a propane-precipitated asphalt base, air-treated at elevated temperature and having a softening point of about 65°-300° C. as measured by ASTM D 36-76, with about 5-60 wt.%, based on the total weight of said asphalt base, of a 1-10 wt.% sulfur-treated liquid petroleum fraction having an atmospheric equivalent boiling range, of about 370°-500° C., thereby producing an asphalt cement composition being of ASTM viscosity grade AC-2½, AC-5, AC-10, AC-20 or AC-40 and meeting the requirements of ASTM D 3381-76 or AASHTO M 226-73, and exhibiting a higher viscosity at 60° C., as measured by the procedure of ASTM STP 532 (1973), in which said viscosity is interpolated at a penetration level of 90 decimillimeters at 25° C., than a comparative non-air treated composition derived from the same propane-precipitated asphalt, whose softening point has not been increased.

Further provided is an asphalt cement composition produced by the above-described process.

In addition, there is provided a process for paving a road surface comprising the step of applying to said surface a paving grade quality asphalt cement composition prepared by the above-described process.

BRIEF DESCRIPTION OF THE DRAWING

The FIGURE is a log-log plot of penetration (25° C.) as the ordinate versus viscosity (60° C.) as the abscissa for various asphalt cement compositions. Compositions which are contained in each "box," e.g., AC-20, satisfy ASTM grade requirements for that particular viscosity range, and temperature susceptibility requirements of ASTM D 3381-76 or AASHTO M 226-73.

DESCRIPTION OF THE INVENTION AND PREFERRED EMBODIMENTS

It is known in the art that the temperature susceptibility and ductility characteristics of an asphalt base are a function of the penetration-viscosity relationships of the material. In general, it is known that the higher the viscosity of a material at a given penetration level, the better the temperature-susceptibility and ductility characteristics. Thus, the viscosity of two different asphalt cement compositions should be determined and compared at the same penetration level to determine which better conforms to specifications. This is difficult to do in practice since the amounts of ingredients i.e. asphalt base and extract oil, to yield a given penetration value cannot be predicted and a number of samples must be prepared. However, the reference "Viscosity Characterization of Asphalt Cement," ASTM STP 532, American Society for Testing Materials, 1973, pp. 40-49, by L. W. Corbett, a coinventor herein, and H. E. Schweyer, said reference hereby incorporated by reference, describes a general procedure by which two different asphalt cements, derived from different crude sources, can be directly compared by using only a small number of samples. The authors prepared a series of asphalt cements derived from a single residuum source, in which each sample in the series contained different amounts of contiguous oil fractions. The viscosity at 60° C. of each sample was measured, according to ASTM D 2717-66, by vacuum capillary viscometry, and the penetration at 25° C. of each sample was measured according to ASTM D 5-73. The authors found that when the data was plotted on log-log scale with the penetration as the ordinate and viscosity as the abscissa a straight line resulted after least-squares regression treatment, obeying the relation:

$$\log (P/P_1) = M \log (V/V_1)$$

where:
P=penetration at 25° C. in decimillimeters;
V=viscosity at 60° C. in poises, corresponding to P;
$P_1$=penetration at 25° C. at another level;
$V_1$=viscosity at 60° C. corresponding to $P_1$;
M=slope of the log-log plot.

Preparing a log-log plot for two or more comparative asphalt cement compositions is accomplished in the manner described above, using at least two reliable data points for each sample. Thus the viscosities of the samples at 60° C., interpolated at the 90 (decimillimeter) penetration level at 25° C. can be directly compared, by the procedure of ASTM STP 532 (1973), described above. In general, the higher the interpolated viscosity at the 90 penetration (25° C.) level, the better the rheological properties of the asphalt. This has been found to be true for air-treated PPA derived asphalt cement, blended with sulfur-treated extract oil, prepared by the instant invention process, as compared to a comparative non air-treated composition derived from the same PPA, whose softening point has not been increased, and blended with non-sulfur-treated extract oil.

The FIGURE illustrates representative straight line relationships obtained by the method described above, in which the respective slope values are not identical, and the lines A and B represent the extreme limits between which all asphalt compositions (from world-wide crude sources) will lie when plotting penetration versus viscosity at the given temperatures. The "boxes," marked AC-2½, AC-5, AC-10, AC-20 and AC-40, being viscosity-penetration ranges, are the ASTM viscosity grade ranges, within which a composition must be to be "in grade," from a viscosity standpoint, and also to be in "specification," as determined by the penetration level, from a temperature susceptibility standpoint, thus meeting the requirements of ASTM D 3381-76 or AASHTO M 226-73. The obtained straight line relationship typifies the behavior of one asphalt base in different degrees of blending with extract oil to yield desired viscosity ranges as plotted against the respective penetration levels. A given blend will yield AC-40 grade and other blends, containing a higher percentage of extract oil, yield AC-20 and lower viscosity grades. Line C typifies the behavior of an asphalt base prepared from a typical light crude oil in which it is seen that grade or specifications are only marginally met. Line D represents the minimum behavior of sulfur-treated asphalt compositions of this invention. Line E represents preferred compositions of this invention wherein one air-treated asphalt base can produce each grade in specification. Line F represents the 90 decimillimeter penetration level along which compositions of the invention are compared to non-air treated compositions, in which the softening point of the PPA has not been increased.

The object of the present invention process is to produce asphalt cement compositions which are "in grade" meet the specifications as promulgated by ASTM D 3381-76, and particularly Table 2 requirements which are listed below:

| Grade | Minimum Penetration Level @ 25° C. (100/5) | Viscosity 60° C. poises |
|---|---|---|
| AC-2½ | 220 | 200-300 |
| AC-5 | 140 | 400-600 |
| AC-10 | 80 | 800-1200 |
| AC-20 | 60 | 1600-2400 |
| AC-40 | 40 | 3200-4800 |

For example, grade AC-10 asphalt cement must possess a minimum penetration (25° C.) level of 80, and a viscosity at 60° C. of 800-1200 poises, thus defining box "AC-10," in the FIGURE.

The most important grades are AC-10 and AC-20, being currently used in the United States. AC-10 is normally used in slightly colder climatic conditions and AC-20 in warmer climatic conditions. The invention process described herein produces all five "grades" of asphalt cements.

To be commercially viable, an asphalt cement must not only be "in grade," it must meet specifications relating to temperature susceptibility promulgated by the transportation agencies in different states or countries, such as ASTM D 3381-76, particularly Table 2, or AASHTO M 226-73, particularly Table II, which are generally equivalent, in the United States. In addition New South Wales, Australia, has promulgated a specification for AC-10 and AC-20 requiring a penetration value (25° C.) of 85-100 (decimillimeters), and a viscosity @70° C. of about 400 centistokes or more. However, the U.S. and Australian specifications are comparable and thus grades AC-10 or AC-20 which meet the U.S. specifications should also meet those of Australia. These tests are hereby incorporated by reference, and involve total evaluation of "graded samples" including penetration value, viscosity at 60° C. and 135° C., flash point, solubility in trichloroethylene, thin-film oven tests, ductility and the like. The instant invention process produces all of the above-described "grades" which satisfy the ASTM or AASHTO requirements referred to above.

The invention process is directed to preparing asphalt cement compositions, preferably of paving grade, derived from air-treated propane-precipitated asphalt, which in turn is derived from a residuum of a crude oil, having a gravity of above about 20° API. Processes for treating a residuum with propane to obtain PPA are well known in the art and these conventional techniques for this purpose may be employed in the present process. PPA useful in the present invention can be prepared from a variety of residua and preferably residua derived from a light middle eastern crude, such as Arabian Light. The gravity of the crude oil can be above 20° API, but it is preferred to conduct the process with lighter crudes, having a gravity about 30° API and particularly preferred in the range of about 30°-40° API.

PPA derived from a residuum, useful in the instant invention process is generally a semi-solid black material preferably having a softening point of about 60°-80° C.

Air-treated PPA is obtained by melting the PPA and allowing a stream of air to pass through the PPA, such as by bubbling and the like, at an elevated temperature preferably above about 200° C. In general, the temperature range operable for the heating is about 200° to 300° C., and preferably about 225° to 270° C. Preferably, air is allowed to percolate upwards through the molten/heated PPA to contact a large surface area of the PPA. Any suitable apparatus can be used for this purpose, such as a heater-stirrer which has air inlets in the bottom or sides of the vessel. The heating is continued with continuous or intermittent stirring, in the presence of the air stream, until the softening point of the PPA has been increased to 65°-300° C. and preferably about 80°-140° C. This can readily be monitored by the use of ASTM D 36-76 softening point measurements. Reaction between air and PPA, as a result of for example, lowering the temperature before the softening point of the PPA has been increased, does not lead to significantly improved temperature susceptibility and ductility characteristics of the final asphalt cement.

The novel feature of the subject process comprises blending an air-treated asphalt base, such as described above, with a sulfur-treated liquid petroleum fraction, having an atmospheric equivalent boiling range of about 370°-500° C., and preferably, 395° to 475° C. Representative examples of liquid petroleum fractions that are sulfur-treated are vacuum gas oil, extract oil, catalytic cycle stock, and the like. Preferred is extract oil for economy and ease of blending.

The liquid petroleum fraction is "sulfur-treated" and by that term, as used herein, is meant that the fraction is heated with about 1-10 wt.% elemental sulfur, at a temperature above 140° C., usually up to about 225° C., until hydrogen sulfide is no longer generated. Preferably, the petroleum fraction is treated with about 2–6 wt.% elemental sulfur.

The blending or "fluxing" step can be accomplished by conventional mixing or blending apparatus and is preferably conducted at a temperature of about 100° C. and above, preferably 125°–150° C., to insure production of a uniform product. Use of lower temperature leads to extended mixing times. Use of the higher boiling sulfur-treated petroleum fractions does not lead to asphalt cement with improved properties, and the use of lower boiling fractions often present volatility problems.

The amount of sulfur-treated petroleum fraction used in the blending step is about 5–60 weight percent, based on the total weight of said asphalt base, and preferably about 10–40 weight percent.

The amount of air-treated asphalt base and sulfur-treated petroleum fraction to be used in the composition depends upon the desired grade, the viscosity and penetration level, the softening point of the asphalt base, which in turn depends upon the air-treatment and the nature of the residuum from which the PPA is derived. The subject process contemplates the scope of all of the stated variables which in combination will result in an asphalt cement of ASTM viscosity grade AC-2½, AC-5, AC-10, AC-20 and AC-40, and meeting the specifications of ASTM D 3381-76 or AASHTO M 226-73, and having a higher viscosity at 60° C., in the range from 200–5000 poises, as measured by the procedure of ASTM STP 532 (1973), interpolated at a penetration level of 90 decimillimeters at 25° C., than a comparative non-air treated composition, derived from the same propane precipitated asphalt fluxed with non-sulfur treated extract oil, or use of PPA, whose softening point has not been increased.

By this last limitation, "whose softening point has not been increased," is meant that by utilizing the same PPA residue in the subject process whose softening point has not been increased, will result in a material having a lower interpolated viscosity, as determined by ASTM STP 532 (1973) than a subject composition prepared by the subject process. The compositions of this invention exhibit improved viscosity properties (60° C.), at a penetration (25° C.) of 90, as compared to comparative samples when: (a) the PPA is not air-treated, but fluxed with sulfur-treated or non-sulfur treated petroleum fraction and (b) the PPA is air-treated and fluxed with untreated petroleum fraction.

Selection of variables, i.e. reaction temperature during air-treating, softening point of the asphalt base, amount of liquid petroleum fraction to be added in order to achieve grade meeting specifications, will be obvious to one skilled in the art from this disclosure without an undue amount of experimentation. For example, if an AC-20 grade is desired, a PPA derived from Arabian Light is air-treated at 260° C. for 4 hours, and the resulting asphalt base is blended with about 25 wt.% of 4 wt.% sulfur-treated extract oil. This will yield an asphalt cement having a minimum penetration @25° C. of 60 and being within the viscosity range of about 1600–2400 poises at 60° C. If the viscosity is slightly out of this range, only a slight adjustment in the amount of sulfur-treated extract oil must be made to meet the viscosity range.

The same asphalt base, meeting one grade, can be utilized to prepare other grades by suitable adjustment in the amount of sulfur-treated extract oil for blending. Thus, if an AC-10 grade is desired, then a larger amount of sulfur-treated extract oil should be employed with the same asphalt base described above. Similarly, larger amounts of sulfur-treated extract oil will be utilized for meeting grades AC-2½ and AC-5, and a smaller amount will be utilized to meet grade AC-40.

The procedure described in ASTM STP 532 (1973) can be utilized to determine how much sulfur-treated extract oil should be added to an air-treated asphalt base in order to meet grade and specification. Several samples of differing viscosity can be prepared. Measurements of the viscosity (60° C.) and penetration (25° C.) are taken and a log-log plot is then prepared. From the plot, the amount of sulfur-treated extract oil needed to be added to the asphalt base to meet specifications can be determined. These and other modification of the process in order to meet grade and specification will become obvious to one skilled in the art from a reading of this disclosure.

The asphalt cement composition produced by the process of this invention also exhibits a higher (fraction being closer to one) penetration ratio (15°/25° C.) than said non-air treated comparative composition derived from the same propane-precipitated asphalt. By the term, "penetration ratio (15°/25° C.) or simply "penetration ratio," as used herein, is meant the ratio of the penetration values obtained at 15° C. and 25° C., respectively, according to ASTM D 5-65. It is known that the higher this ratio, the less the temperature susceptibility to changes in penetration value, and the better the asphalt cement with respect to meeting specifications within a particular grade. In general, the "penetration ratio" for compositions of this invention is usually above 0.290, and preferably above 0.320.

The asphalt cement composition produced by the instant invention process also generally exhibits improved ductility characteristics over comparative non-air treated compositions. The test is performed according to ASTM D 113-79, and the results are interpolated to the same penetration values of about 87–88 at 25° C. In general, the subject compositions will exhibit higher penetration ratios and ductilities, in combination, than comparative examples.

Also a subject of the instant invention is the asphalt cement composition, described herein, produced by the above-described process, being of ASTM viscosity grades AC-2½, AC-5, AC-10, AC-20 and AC-40, and meeting the requirements of ASTM D 3381-76 (particularly Table 2), or AASHTO M 226-73 (particularly Table II).

The scope of the subject compositions covered is the same as the scope of the compositions produced by the subject process with respect to the asphalt cement. Details of the properties and manufacture of the composition are described above and need not be reiterated.

A further embodiment of the subject composition of this invention is a road paving mixture, i.e. asphaltic concrete, further comprising mineral aggregate, such as, inorganic particulate aggregate. Representative examples are stone, sand and/or mineral filler.

The mineral aggregate is usually present in about 90 to 96 weight percent of the asphaltic composition to achieve a material suitable for road paving applications.

Also a subject of this invention is a process for paving a road surface comprising the step of applying to said surface a paving grade quality asphalt cement composition prepared by the above-described subject process.

The preparation step can be conducted by heating the asphalt cement composition to a suitable temperature of about 150° C., for good flow properties and then directly applying the hot asphaltic composition, as is, to the road surface by conventional techniques such as spraying, applying mineral aggregate and then rolling, or directly applying the resulting asphaltic concrete mixture to the road surface and rolling.

The scope of the asphalt composition covered in this process is the same as the scope of the subject compositions described hereinabove since the compositions must be of paving grade quality, selected from the group consisting of AC-2½, AC-5, AC-10, AC-20 and AC-40 and meeting the specifications of ASTM D 3381-76 (particularly Table 2) or AASHTO M 226-73 (particularly Table II).

The following examples are illustrative of the best mode of carrying out the invention as contemplated by us and should not be construed as being limitations on the scope or spirit of the instant invention.

Parts are by weight unless otherwise indicated. The propane-precipitated asphalt, PPA, in all cases was derived from the residuum of a Light Arabian Crude, having a gravity of about 34.4° API. The softening point of the PPA used was 64° C. The extract oil used, which was non-sulfur treated, had an equivalent atmospheric boiling range of 395° to 475° C., and a viscosity of about 9 centistokes at 98.9° C.

COMPARATIVE EXAMPLE 1

PPA, 83 wt.%, and extract oil 17 wt.%, were blended together at 135° C. in a conventional heating-mixing apparatus to yield an asphalt cement.

COMPARATIVE EXAMPLE 2

This sample was prepared by the same procedure described in Comparative Example 1 except that PPA, 85 wt.% and extract oil 15, wt.% were used.

COMPARATIVE EXAMPLE 3

This sample was prepared by the same procedure described in Comparative Example 1 except that PPA, 85.5 wt.% and extract oil, 14.5 wt.% were used.

COMPARATIVE EXAMPLE 4

PPA was treated by blowing air into the molten material from a standard air-jet at 260° C. for about 2 hours. The air blown material, 73.5 wt.%, having a softening point about 88° C., and extract oil, 26.5 wt.%, were blended together as described above.

COMPARATIVE EXAMPLE 5

This sample was prepared by the same procedure described in Comparative Example 4 except that air-blown PPA, 76.5 wt.%, was blended with extract oil, 23.5 wt.%.

COMPARATIVE EXAMPLE 6

PPA, 79.5 wt.%, and extract oil, 20.5%, which was treated with 4 wt.% sulfur at 200°–225° C. and having a viscosity of 40 centistokes @98.9° C. and a boiling point of 395° to 475° C., were blended together as described above.

Example

Air-blown PPA (prepared as described in Comparative Example 2) 69.5 wt.%, and extract oil, (treated with 4 wt.% sulfur as described in Comparative Example 6) 30.5 wt.%, were blended together as described above.

Properties of the different PPA bases prepared above are listed below in Table I with assigned symbols for convenience in identification. Table II below lists the weight percentages of constituents in each of the resulting asphalt cement compositions. Table III below lists the physical properties of each of the resulting asphalt cement compositions.

TABLE 1

| PPA Base Properties | | | |
|---|---|---|---|
| PPA Base | Symbol | Softening Point (ASTM D 36-76) | Wt. % Sulfur |
| PPA, untreated | PPA | 64° C. | 0 |
| Air Blown PPA | A-PPA | 86° C. | 0 |

TABLE II

| ASPHALT CEMENT COMPOSITIONS | | | |
|---|---|---|---|
| Example | Crude Composition (wt. %, PPA type) | Extract Oil[a], wt. % | Sulfur, Wt. % |
| Comp. Ex. 1 | 83 PPA | 17 | 0 |
| Comp. Ex. 2 | 85 PPA | 15 | 0 |
| Comp. Ex. 3 | 85.5 PPA | 14.5 | 0 |
| Comp. Ex. 4 | 73.5 A-PPA | 26.5 | 0 |
| Comp. Ex. 5 | 76.5 A-PPA | 23.5 | 0 |
| Comp. Ex. 6 | 79.5 PPA | 20.5[b] | 4 |
| Example | 69.5 A-PPA | 30.5[b] | 4 |

[a]Extract oil, non-sulfur treated having viscosity of 9 centistokes at 98.9° C. and boiling range of 395° to 475° C. at one atmosphere.
[b]Above extract oil treated with 4 wt. % sulfur at 200–225° C. and having resulting viscosity of 40 centistokes at 98.9° C.

TABLE III

| PROPERTIES OF ASPHALT CEMENT COMPOSITIONS | | | | | | |
|---|---|---|---|---|---|---|
| Example | Pen. @ 25° C.[a] | Vis. @ 60° C.[b] | Vis. @ 60° C. Adj. to 90 PEN[c] | Pen. @ 15° C. | Pen. Ratio (15/25° C.) | Ductility[d] |
| Comp. Ex. 1 | 94 | 1196 | 1260 | 22 | 0.234 | 3 |
| Comp. Ex. 2 | 84 | 1429 | 1220 | 21 | 0.250 | 3 |
| Comp. Ex. 3 | 65 | —[e] | —[e] | —[e] | —[e] | —[e] |
| Comp. Ex. 4 | 88 | 1545 | 1500 | —[e] | —[e] | 9 |
| Comp. Ex. 5 | 88 | —[e] | —[e] | —[e] | —[e] | 9 |
| Comp. Ex. 6 | 87 | 1487 | 1400 | 25 | 0.287 | 0.5 |
| Example | 78 | 2734 | 2120 | 25 | 0.321 | —[e] |

[a]ASTM D 5-73
[b]ASTM D 2171-66
[c]ASTM STP 532 (1973)
[d]ASTM D 113-79 @ 4° C., interpolated to an 87-88 decimillimeter penetration level.
[e]Not measured.

What is claimed is:

1. A process for preparing an asphalt cement composition comprising the step of:

blending a propane-precipitated asphalt base, air-treated at elevated temperature and having a softening point of about 65°–300° C. as measured by ASTM D 36-76, with about 5–60 wt.%, based on the total weight of said asphalt base, of a 1–10 wt.% sulfur-treated liquid petroleum fraction having an atmospheric equivalent boiling range, of about 370°–500° C., thereby producing an asphalt cement composition being of ASTM viscosity grade AC-2½, AC-5, AC-10, AC-20 or AC-40 and meeting the requirements of ASTM D 3381-76 or AASHTO M 226-73, and exhibiting a higher viscosity at 60° C., as measured by the procedure of ASTM STP 532 (1973), in which said viscosity is interpolated at a penetration level of 90 decimillimeters at 25° C., than a comparative non-air treated composition derived from the same propane-precipitated asphalt, whose softening point has not been increased.

2. The process of claim 1 wherein said propane-precipitated asphalt is derived from a crude oil having a gravity of above about 20° API.

3. The process of claim 1 wherein said propane-precipitated asphalt is air-treated at a temperature of about 200° to 300° C.

4. The process of claim 1 wherein said air-treated asphalt base has a softening point of about 80° to 140° C., as measured by ASTM D-36-76.

5. The process of claim 1 wherein said air-treated asphalt base is blended with about 10 to 40 weight percent, based on total weight of said asphalt base, with said sulfur treated liquid petroleum fraction.

6. The process of claim 1 wherein said liquid petroleum fraction is treated with about 2–6 wt.% sulfur.

7. The process of claim 1 wherein said liquid petroleum fraction is an extract oil.

8. The process of claim 1 wherein said liquid petroleum fraction is vacuum gas oil.

9. The process of claim 1 wherein said asphalt cement composition further meets the specifications of ASTM D 3381-76, Table 2, or AASHTO M 226-76, Table II.

10. A process for preparing an asphalt cement composition comprising the steps of:
   (a) contacting a molten propane-precipitated asphalt, derived from a residuum of a crude oil, having a gravity of above about 20° API, with a stream of air at a temperature of above about 200° C. resulting in an air-treated asphalt base having a higher softening point than said propane-precipitated asphalt and being in the temperature range of about 65°–300° C., as measured by ASTM D-36-76; and
   (b) blending said air-treated asphalt base, at a temperature of about 125°–150° C., with about 5–60 wt.%, based on the total weight of said asphalt base, of a 1–10 wt.% sulfur-treated liquid petroleum fraction having an atmospheric equivalent boiling range of about 370°–500° C., thereby producing an asphalt cement composition being of ASTM viscosity grade AC-2½, AC-5, AC-10, AC-20 or AC-40 and meeting the requirements of ASTM D 3381-76 or AASHTO M 226-73, and exhibiting a higher viscosity at 60° C., as measured by the procedure of ASTM STP 532 (1973), in which said viscosity is interpolated at a penetration level of 90 decimillimeters at 25° C., than a comparative non-air treated composition derived from the same propane-precipitated asphalt, whose softening point has not been increased.

11. An asphalt cement composition prepared by the process of claim 1.

12. The asphalt cement composition of claim 11 further comprising mineral aggregate.

13. A process for paving a road surface comprising the step of applying to said surface a paving grade asphalt cement composition prepared by the process of claim 1.

* * * * *